(12) United States Patent
Yasuda

(10) Patent No.: US 9,277,131 B2
(45) Date of Patent: Mar. 1, 2016

(54) IMAGE STABILIZATION APPARATUS, OPTICAL APPARATUS, AND IMAGE CAPTURING APPARATUS

(71) Applicant: CANON KABUSHIKI KAISHA, Tokyo (JP)

(72) Inventor: Hiromu Yasuda, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/380,497

(22) PCT Filed: Feb. 28, 2013

(86) PCT No.: PCT/JP2013/001213
§ 371 (c)(1),
(2) Date: Aug. 22, 2014

(87) PCT Pub. No.: WO2013/132795
PCT Pub. Date: Sep. 12, 2013

(65) Prior Publication Data
US 2015/0009346 A1    Jan. 8, 2015

(30) Foreign Application Priority Data

Mar. 8, 2012   (JP) ................. 2012-051457

(51) Int. Cl.
*H04N 5/232*   (2006.01)
*G03B 5/00*    (2006.01)
*G02B 27/64*   (2006.01)

(52) U.S. Cl.
CPC .............. *H04N 5/23287* (2013.01); *G03B 5/00* (2013.01); *G03B 2205/0015* (2013.01)

(58) Field of Classification Search
CPC .................. G03B 5/00; G03B 5/0015; G03B 2205/0007; G03B 2205/0038; H04N 5/23287; H04N 5/23248; G02B 27/64
USPC ........... 348/208.11, 208.99; 396/55; 359/557; 382/107
See application file for complete search history.

(56) References Cited

U.S. PATENT DOCUMENTS 5,122,908 A   6/1992  Sporer
5,835,799 A   11/1998 Washisu
(Continued)

FOREIGN PATENT DOCUMENTS

JP   07-005514 A   1/1995
JP   09-244087 A   9/1997
(Continued)

OTHER PUBLICATIONS

Notification of Grant issued by the Russian Patent Office, issued in Russian Patent Application No. 2014140611.

*Primary Examiner* — Tuan Ho
*Assistant Examiner* — Marly Camargo
(74) *Attorney, Agent, or Firm* — Cowan, Liebowitz & Latman, P.C.

(57) ABSTRACT

An image stabilization apparatus is provided that includes a fixed back-plate 101, a movable barrel 103 that holds a correction lens 102 and is movably supported by the fixed back-plate 101 in a direction perpendicular to the optical axis, a first rotary body 104 that is rotatably supported by the fixed back-plate 101 and moves the movable barrel 103 in a first direction depending on rotation thereof, and a first drive motor 106 that drives the first rotary body 104. The center axis of the first rotary body 104 is arranged within the optical path of an image capturing optical system.

11 Claims, 11 Drawing Sheets

(56) References Cited

U.S. PATENT DOCUMENTS

| | | | |
|---|---|---|---|
| 6,064,827 A * | 5/2000 | Toyoda | G02B 27/646 |
| | | | 396/55 |
| 6,992,700 B1 * | 1/2006 | Sato | G03B 5/00 |
| | | | 348/208.11 |
| 7,688,354 B2 | 3/2010 | Nomura et al. | |
| 8,319,844 B2 | 11/2012 | Kimura | |
| 8,928,977 B2 * | 1/2015 | Yasuda | G02B 27/646 |
| | | | 359/557 |
| 2003/0007794 A1 | 1/2003 | Enomoto | |
| 2008/0080053 A1 | 4/2008 | Homme | |
| 2010/0157071 A1 * | 6/2010 | Lee | G03B 5/00 |
| | | | 348/208.2 |
| 2010/0195206 A1 * | 8/2010 | Miyamori | G02B 27/646 |
| | | | 359/557 |
| 2011/0001872 A1 * | 1/2011 | Honsho | G02B 7/102 |
| | | | 348/362 |
| 2011/0103783 A1 * | 5/2011 | Tsutsumi | G03B 5/00 |
| | | | 396/55 |
| 2015/0195460 A1 * | 7/2015 | Yasuda | H04N 5/23287 |
| | | | 348/208.11 |

FOREIGN PATENT DOCUMENTS

| | | |
|---|---|---|
| JP | 11-109435 A | 4/1999 |
| JP | 2003-075882 A | 3/2003 |
| JP | 2003-330056 A | 11/2003 |
| JP | 2007-041455 A | 2/2007 |
| JP | 2008-058445 A | 3/2008 |
| JP | 2008-090032 A | 4/2008 |
| RU | 2091843 C1 | 9/1997 |

* cited by examiner

IMAGE STABILIZATION APPARATUS, OPTICAL APPARATUS, AND IMAGE CAPTURING APPARATUS

TECHNICAL FIELD

The present invention relates to an image stabilization apparatus, an optical apparatus, and an image capturing apparatus.

BACKGROUND ART

There has been proposed an image capturing apparatus such as a digital camera or the like mounted with an image stabilization apparatus. The image stabilization apparatus drive-controls a movable member for holding a lens or an image capturing element in a plane perpendicular to the optical axis by moving the movable member in the horizontal direction (yaw direction) and the vertical direction (pitch direction) as viewed from the optical axial direction as required.

Patent Literature 1 discloses an image stabilization apparatus that causes a pair of flat-type voice coil motors to drive a movable barrel in the yaw direction and the pitch direction. Patent Literature 2 discloses an optical apparatus that corrects a movable barrel in the yaw direction and the pitch direction by rotating a pair of rotary bodies having a rotation center located outside the movable barrel.

CITATION LIST

Patent Literature

However, in the image stabilization apparatus using a pair of flat-type voice coil motors as disclosed in Patent Literature 1, if an attempt is made to ensure the amount of Patent Literature 1: Japanese Patent Laid-Open No. 2008-58445

Patent Literature 2: Japanese Patent Laid-Open No. 11-109435

However, in the image stabilization apparatus using a pair of flat-type voice coil motors as disclosed in Patent Literature 1, if an attempt is made to ensure the amount of movement required for a correction lens serving as an image stabilization unit, a movable region in the apparatus increases, resulting in an increase in the size of the entire apparatus.

FIG. 11 is an exemplary cross-sectional diagram of an image stabilization apparatus using a flat-type voice coil motor. A lens holder 302 supports a correction lens 301. A drive coil 304 and a magnet (consisting of an N-pole magnet 305N and an S-pole magnet 305S) attached to the lens holder 302 are actuators for driving the lens holder 302. As shown in FIG. 11, a clearance in the amount of movement (assumed to be "L") required for a correction lens is required between the lens holder 302 and a fixation member 303.

Since the drive coil 304 and the magnet 305 need to be opposed to each other regardless of the position of the correction lens 301, the width of each of the magnets 305N and 305S needs to be at least equal to or greater than L, the width of L or greater is also required between the N-pole and the S-pole. Furthermore, the amount of L outside the drive coil is required for a space for movement of a coil. In other words, in the image stabilization apparatus using a flat-type voice coil motor, if the amount of movement required for the correction lens is increased by L, a space for the entire apparatus is increased by 5L. Thus, the size of the entire apparatus is not reduced.

On the other hand, the image stabilization apparatus disclosed in Patent Literature 2 drives a lens holder by means of two rotary bodies having a cam. In the image stabilization apparatus, when the amount of movement required for the correction lens is increased by L, the amount of change in the cam is increased by L and the clearance between the lens holder and the fixation member is increased by L. Thus, the amount of increase in the entire apparatus is 2L, this structure is advantageous for reducing the size of the apparatus. At this time, a predetermined speed reduction ratio must be ensured so as to achieve the acquired accuracy and output. For this purpose, the radius of the rotary body needs to be increased. However, when the radius of the rotary body is increased, the size of the entire apparatus is undesirably increased.

SUMMARY OF INVENTION

The image stabilization apparatus of the present invention suppresses an increase in size of the entire apparatus while ensuring a space in which an image stabilization unit moves.

According to an aspect of the present invention, an image stabilization apparatus is provided that includes a fixation member; a movable member that holds an image stabilization unit for correcting image blur and is movable in a direction not in parallel with the optical axis of an image capturing optical system; a first rotation member that rotates by being supported by the fixation member and moves the movable member in a first direction; a second rotation member that rotates by being supported by the fixation member and moves the movable member in a second direction different from the first direction; wherein the rotating axis of at least one of the first and the second rotation members is arranged within the optical path of the image capturing optical system; a first drive unit that drives the first rotation member; and a second drive unit that drives the second rotation member.

The image stabilization apparatus of the present invention includes a hollow rotary body provided around the periphery of an image stabilization unit. A movable member for holding the image stabilization unit is driven by the rotary body. Thus, according to the image stabilization apparatus of the present invention, an increase in size of the entire apparatus may be suppressed while a space in which an image stabilization unit moves is ensured.

DESCRIPTION OF EMBODIMENTS

Hereinafter, a description will be given of an image stabilization apparatus according to a first embodiment of the present invention with reference to FIGS. 1 to 8. Firstly, a description will be given of the parts constituting the image stabilization apparatus of the present embodiment with reference to FIGS. 1 to 3.

Figure 1:
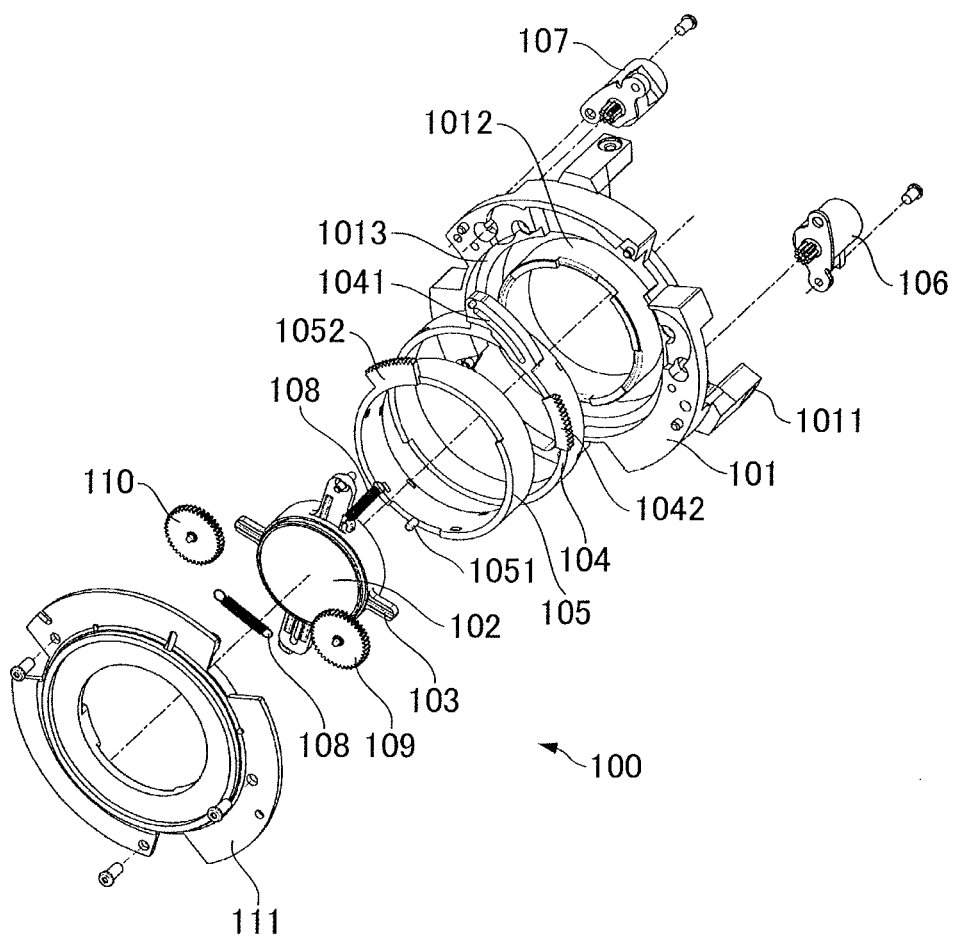
FIG. 1 is an exploded perspective view illustrating the configuration of the parts of an image stabilization apparatus according to a first embodiment.
Figure 2:
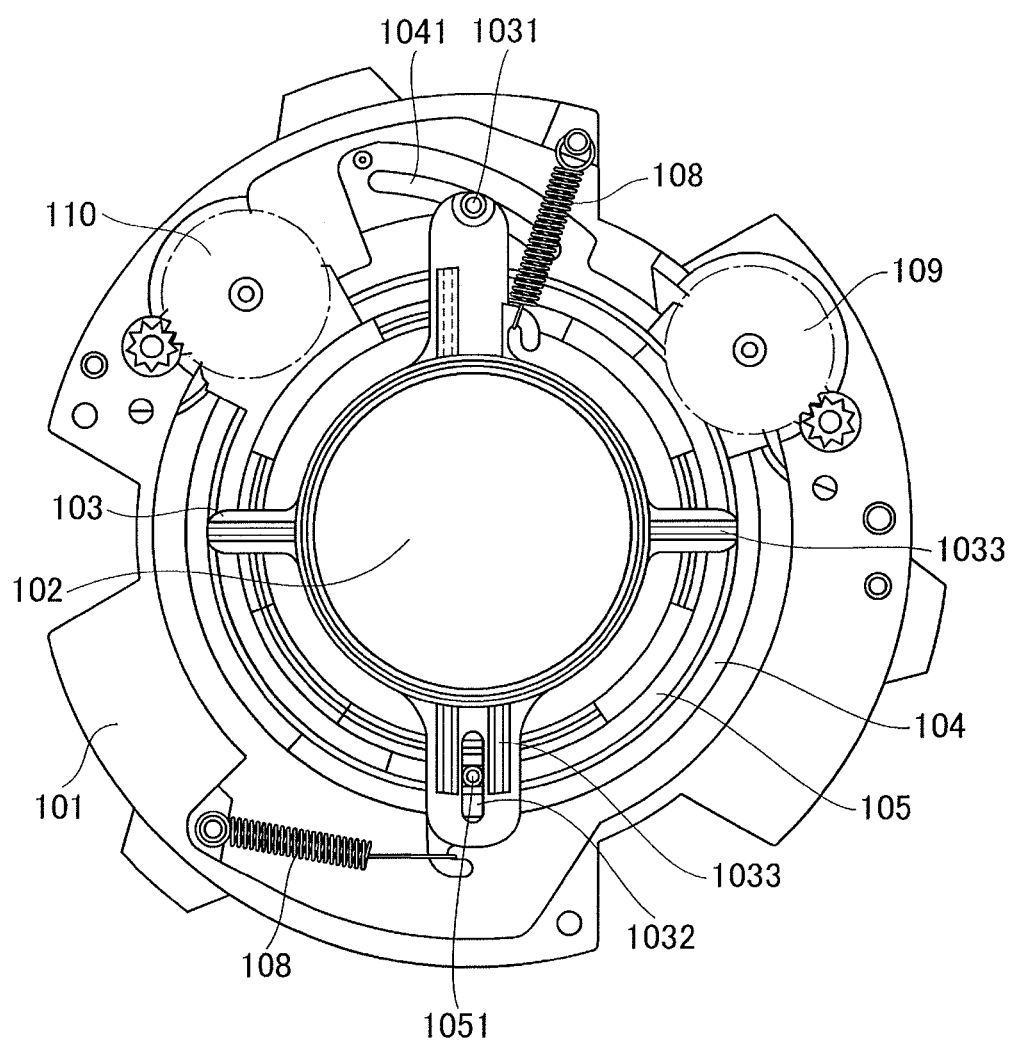
FIG. 2 is a front view illustrating an image stabilization apparatus after the assembly.
Figure 3:
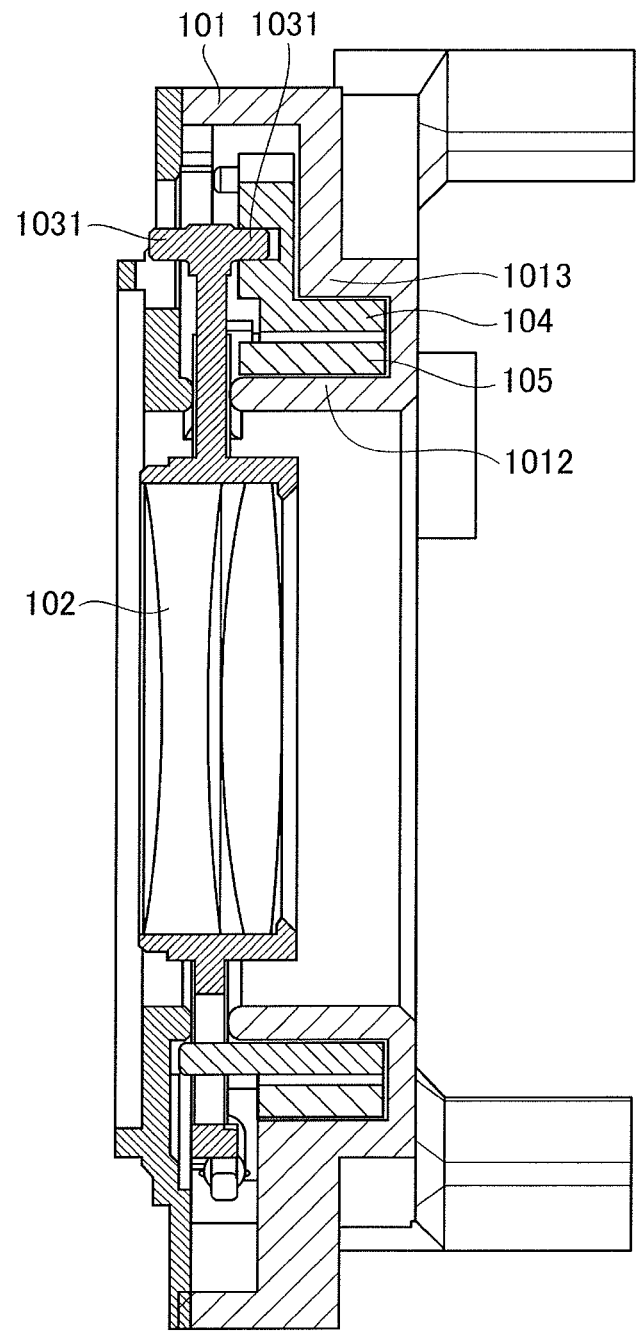
FIG. 3 is a cross-sectional view illustrating an image stabilization apparatus.

FIG. 1 is an exploded perspective view illustrating the configuration of the parts of the image stabilization apparatus of the present embodiment. An image stabilization apparatus 100 is the image stabilization apparatus of the present embodiment. The optical apparatus of the present embodiment includes the image stabilization apparatus 100. Examples of the optical apparatus include a telescope, a binocular, and an image capturing apparatus. FIG. 2 is a front view illustrating an image stabilization apparatus after the assembly. FIG. 3 is a cross-sectional view illustrating the image stabilization apparatus shown in FIG. 2 when the image stabilization apparatus is cut along the plane parallel to the optical axis.

The image stabilization apparatus 100 includes a fixed back-plate 101, a correction lens 102, a movable barrel 103, a first rotary body 104, a second rotary body 105, a first motor 106, a second motor 107, an urging spring 108, a first speed-reduction gear 109, a second speed-reduction gear 110, and a lid 111.

The fixed back-plate 101 constitutes a fixation member that is formed in a generally disk-shape. The fixed back-plate 101 has an opening, which is greater than the external shape of the movable barrel, formed at the center thereof. The movable barrel 103 can be arranged in the opening. The movable range of the movable barrel 103 is restricted by the opening.

Also, the fixed back-plate 101 has three mounting holes 1011 provided in the outer peripheral surface thereof. The fixed back-plate 101 is fixed to a lens barrel for fixing other lens groups (e.g., image forming optical system) by utilizing the mounting holes 1011.

As shown in FIG. 3, the fixed back-plate 101 has a second bearing portion 1012 cylindrically formed around an opening. The second bearing portion 1012 can pivotally support the second rotary body 105 at the outer peripheral part thereof. A first bearing portion 1013 is provided at the further outer periphery of the second bearing portion 1012. The first bearing portion 1013 can pivotally support the first rotary body 104 at the inner peripheral part thereof. Also, the fixed back-plate 101 has a gear spacer in which the first speed-reduction gear 109 and the second speed-reduction gear 110 can be pivotally supported.

The correction lens 102 is a lens that constitutes a part of an image capturing optical system (not shown) and moves in anti-parallel to the optical axis so that the optical axis is eccentrically-sifted. For example, the correction lens 102 moves in a direction perpendicular to the optical axis so that an image formed by the image capturing optical system can be moved. In this manner, when the apparatus detects an unintentional movement of hand, the apparatus moves the correction lens 102 so as to reduce the movement of an image due to an unintentional movement of hand, whereby stability of an image plane can be ensured. In other words, the correction lens 102 functions as an image stabilization unit that corrects image blur. While in the present embodiment, a lens is used as an image stabilization unit, an image capturing element such as a CCD or a CMOS sensor may also be used.

The movable barrel (movable member) 103 can hold the correction lens 102 at the central opening thereof. Also, the movable barrel 103 has a sliding surface 1033 that radially extends perpendicular to the optical axis around a lens holding section. The sliding surface 1033 is held by a fixation member, and thus, the movable barrel 103 is movably supported within a given range in a plane perpendicular to the optical axis.

The movable barrel 103 includes a drive pin (first drive pin) 1031 and an elongated hole 1032. The drive pin 1031 fits with a fixed guide section 1111 provided on the lid 111 and a cam groove 1041 provided on a first rotation member. Also, the elongated hole 1032 is a linear groove that fits with a second joint section 1051 provided on the second rotary body 105. The elongated hole 1032 is set to pass through the center of the correction lens 102 and the center of the drive pin 1031 when the elongated hole 1032 is extended in the longitudinal direction. The drive pin 1031 is a cylindrical shaft that functions as a first shaft portion.

The first rotary body 104 has a hollow cylindrical shape and the correction lens 102 is arranged at the central opening thereof. Thus, the center axis of the first rotary body 104 is coaxial with the optical axis obtained when the correction lens 102 is located at the center of the movable region. The center axis of the first rotary body 104 is arranged within the optical path formed by the correction lens 102.

The outer periphery of the first rotary body 104 is pivotally supported by the first bearing portion 1013 so that the first rotary body 104 is rotatably supported by the fixed back-plate 101. Also, the first rotary body 104 has the cam groove 1041 that guides the drive pin 1031 of the movable barrel 103. In the present embodiment, when the rotational angle of the first rotary body 104 is alpha and the distance from the rotating axis of the first rotary body 104 to the center of the cam groove 1041 is Ra, the following formula corresponding to a so-called Archimedean spiral is satisfied:

$$Ra = k\text{alpha (where } k \text{ is constant)}$$

Here, the cam groove 1041 corresponds to a third guide portion. The cam groove 1041 fits with the drive pin 1031 serving as the first shaft portion, and the intersection of the cam groove 1041 with the first shaft portion varies depending on the rotation of the first rotary body 104. In other words, the first rotary body 104 moves the movable barrel 103 in a first direction depending on the rotation thereof.

Also, the first rotary body 104 has a gear 1042 provided on a part of the outer periphery thereof and can transmit the rotation of the first motor 106. The second rotary body 105 has a hollow cylindrical shape and the correction lens 102 is arranged at the central opening thereof. Thus, the center axis of the second rotary body 105 is coaxial with the optical axis obtained when the correction lens 102 is located at the center of the movable region. The center axis of the second rotary body 105 is arranged within the optical path formed by the correction lens 102. The center axis of at least one of the first rotary body 104 and the second rotary body 105 may be arranged within the optical path by the correction lens 102, or both the center axis of the first rotary body 104 and the second rotary body 105 may be arranged within the optical path by the correction lens 102. The inner periphery of the second rotary body 105 is pivotally supported by the second bearing portion 1012 so that the second rotary body 105 is rotatably supported by the fixed back-plate 101. The second rotary body 105 includes a drive pin 1051 serving as a second shaft portion provided at an opposite side sandwiching the drive pin 1031 and the correction lens 102. The drive pin 1051 is a cylindrical shaft or a spherical shaft. The drive pin 1051 fits with the elongated hole 1032 provided on the movable barrel 103 and is guided in the elongated hole 1032. In other words, the second rotary body 105 is rotatably supported by the fixed back-plate 101 and moves the movable barrel 103 in a second direction different from the first direction depending on the rotation thereof. Also, the second rotary body 105 has a gear 1052 provided on a part of the outer periphery thereof.

The first motor 106 is a motor for rotationally moving the first rotary body 104 and is attached to the fixed back-plate 101. In the present embodiment, open loop control may also be performed by utilizing a stepping motor as a drive unit. A pinion gear is attached to the rotor part of the first motor 106 so that rotation can be transmitted to the gear 1042 of the first rotary body 104. In the present embodiment, predetermined rotation accuracy and driving force are obtained by reducing the speed of the rotation of the first motor 106 by use of the first speed-reduction gear 109.

The second motor 107 is a drive unit for rotationally moving the second rotary body 105 and is attached to the fixed back-plate 101. In the present embodiment, open loop control may also be performed by utilizing a stepping motor as a drive unit. A pinion gear is attached to the rotor part of the second motor 107 so that rotation can be transmitted to the gear 1052 of the second rotary body 105. In the present embodiment, predetermined rotation accuracy and driving force are obtained by reducing the speed of the rotation of the second motor 107 by use of the second speed-reduction gear 110.

The urging spring 108 is provided between the movable barrel 103 and the fixed back-plate 101 and functions as an urging unit for imparting an urging force to the movable barrel 103 in a direction perpendicular to the optical axis. For example, the urging spring 108 is a tension spring. In the present embodiment, there are some factors for generating backlash such as the backlash in the fitting of the first rotary body to the second rotary body, the backlash in the fitting of the first drive pin to the second drive pin, and the like. The urging spring 108 can keep these backlashes biased to one side. While, in the present embodiment, two urging springs are used, the number of urging springs may be any number as long as backlash can be biased at any position.

The first speed-reduction gear 109 includes a large gear and a small gear that are coaxial with each other and have a different number of teeth. The first speed-reduction gear 109 is rotatably supported by the fixed back-plate 101. The first speed-reduction gear 109 reduces the speed of the rotation of the first drive unit 106 and transmits it to the first rotary body 104.

The second speed-reduction gear 110 includes a large gear and a small gear that are coaxial with each other and have a different number of teeth. The second speed-reduction gear 110 is rotatably supported by the fixed back-plate 101. The second speed-reduction gear 110 reduces the speed of the rotation of the second drive unit 107 and transmits it to the second rotary body 105.

The lid 111 has a fixed guide section 1111. The fixed guide section 1111 is a linear groove that extends in the radially outward direction by passing through the center axis of the rotary body and can be fitted to the drive pin 1031. The fixed guide section 1111 is a first guide portion. Note that the elongated hole 1032 provided in the aforementioned movable barrel 103 is a second guide portion.

The lid 111 is connected to the fixed back-plate 101 and constitutes a fixation member together with the fixed back-plate 101. The lid 111 supports the movable barrel 103 such that the movable barrel 103 moves in a plane perpendicular to the optical axis by sandwiching the sliding surface 1033 of the movable barrel between the lid 111 and the fixed back-plate 101.

Figure 4:
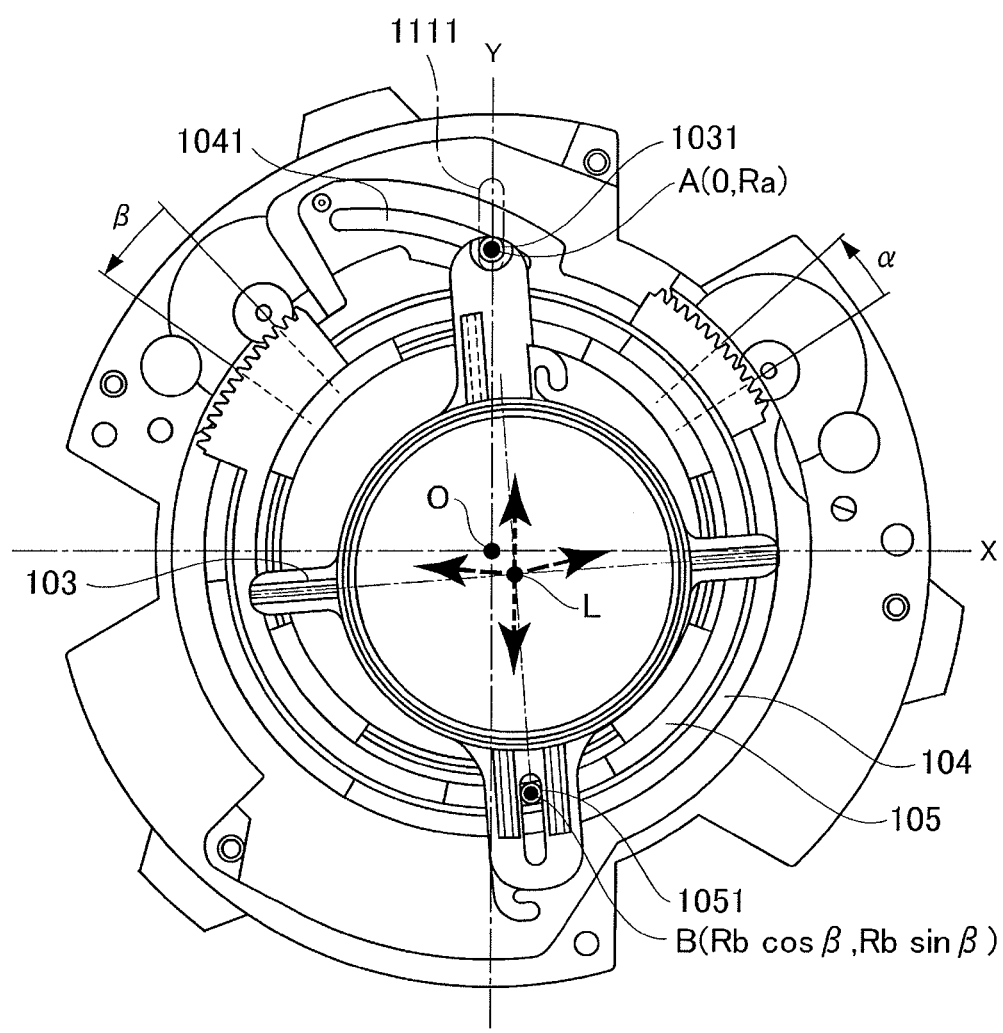
FIG. 4 is a diagram illustrating the positioning and operation of a movable barrel.

FIG. 4 is a diagram illustrating the positioning and operation of a movable barrel. As described above, the position of the movable barrel 103 is determined in the optical axial direction by sandwiching the sliding surface 1033 of the movable barrel 103 between the fixed back-plate 101 and the lid 111. Furthermore, the drive pin 1031 of the movable barrel is guided to the fixed guide section 1111 and the cam groove 1041, and thus, positioning one point on the movable barrel is achieved. Then, the elongated hole 1032 is fitted to the second drive pin 1051 provided on the second rotary body 105 so that the angular direction of the movable barrel 103 is determined. In this manner, the position of the movable barrel 103 is uniquely determined. In this state, the correction lens 102 is movable to any position on a plane perpendicular to the optical axis by moving the first rotary body 104 and the second rotary body 105 to predetermined positions.

When the first rotary body 104 is rotated in a state where the second rotary body 105 is stationary, the drive pin 1031 is pushed into the cam groove 1041 to thereby be moved along the fixed guide section 1111. The movable barrel 103 is moved while the elongated hole 1033 is guided by the drive pin 1051.

The angle between the fixed guide section 1111 and the elongated hole 1033 is 180 degrees or an angle close to 180 degrees. Thus, the center of the correction lens 102 is moved in a substantial linear direction as shown by a dotted line arrow in FIG. 4. More precisely, the movement of the movable barrel 103 involves slight rotational movement depending on the position of the drive pin 1051. As described above, the movement direction of the movable barrel 103 when the first rotary body 104 is rotated in a state where the second rotary body 105 is stationary is the first direction in the present embodiment.

On the other hand, when the second rotary body 105 is rotated in a state where the first rotary body 104 is stationary, the movable barrel 103 performs rotational movement about the drive pin 1031. Thus, the movable barrel 103 can move the center of the correction lens 102 so as to form an arc movement track. In other words, the center of the correction lens 102 is moved in a direction along the broken line arrow shown in FIG. 4. As described above, the movement direction of the movable barrel 103 when the second rotary body 105 is rotated in a state where the first rotary body 104 is stationary is the second direction in the present embodiment.

The correction lens 102 is movable to any position within a plane by combining the movement of the movable barrel 103 in the first direction with the movement of the movable barrel 103 in the second direction. Note that the correction lens 102 used in the present embodiment is a rotary body that is rotatable about the optical axis. Thus, the rotational movement of the movable barrel 103 does not cause a problem as long as the central position of the correction lens 102 is accurately positioned. Note that when a non-rotationally-symmetric body such as an image capturing element or the like is used as an image stabilization unit, such a non-rotationally-symmetric body may be used within a range in which the effects of rotation can be ignored or another rotation mechanism may be used between a movable barrel and an image stabilization unit.

A further detailed description will be given of the movement of the correction lens 102. Firstly, as shown in FIG. 4, the center of the rotation axis of the first and second rotary bodies is defined as the zero point O, and the Y axis is aligned from the zero point in a direction parallel to the guide direction of the fixed guide section 1111 and the X axis is aligned in a direction perpendicular to the Y axis. The central point of the drive pin 1031 is the point A, the central point of the drive pin 1051 is the point B, and the central point of the correction lens 102 is the point L.

The distance between the point O and the point A is Ra, the distance between the point O and the point B is Rb, the distance between the point A and the point L is d, the component in the AB direction from the point A to the point L is d1, the component in a direction perpendicular to AB is d2, and the rotating amount of the second rotary body is beta. In the present embodiment, an extended line of the fixed guide section 1111 passes through the rotation center of the second rotary body 105. Also, an extended line of the elongated hole 1032 passes through the drive pin 1031 and the center of the correction lens 102. Thus, the point A and the point B are represented by the following Formula (1) and Formula (2):

[Formula 1]

$$\overrightarrow{OA} = (0, R_a) \qquad \text{Formula (1)}$$

$$\overrightarrow{OB} = (R_b \cos\beta, R_b \sin\beta) \qquad \text{Formula (2)}$$

In the present embodiment, the point L is arranged on the line AB, and thus, the following Formula (3) is satisfied:

[Formula 2]

$$\overrightarrow{OL} = (L_x, L_y) = \overrightarrow{OA} + \frac{d_1}{|\overrightarrow{AB}|}\overrightarrow{AB} + \frac{d_2}{|\vec{p}|}\vec{p} =$$

$$(0, R_a) + \frac{d_1(R_b\cos\beta, R_b\sin\beta - R_a) +}{\sqrt{R_a^2 + R_b^2 - 2R_a\sin\beta}} \qquad \text{Formula (3)}$$

Figure 5:
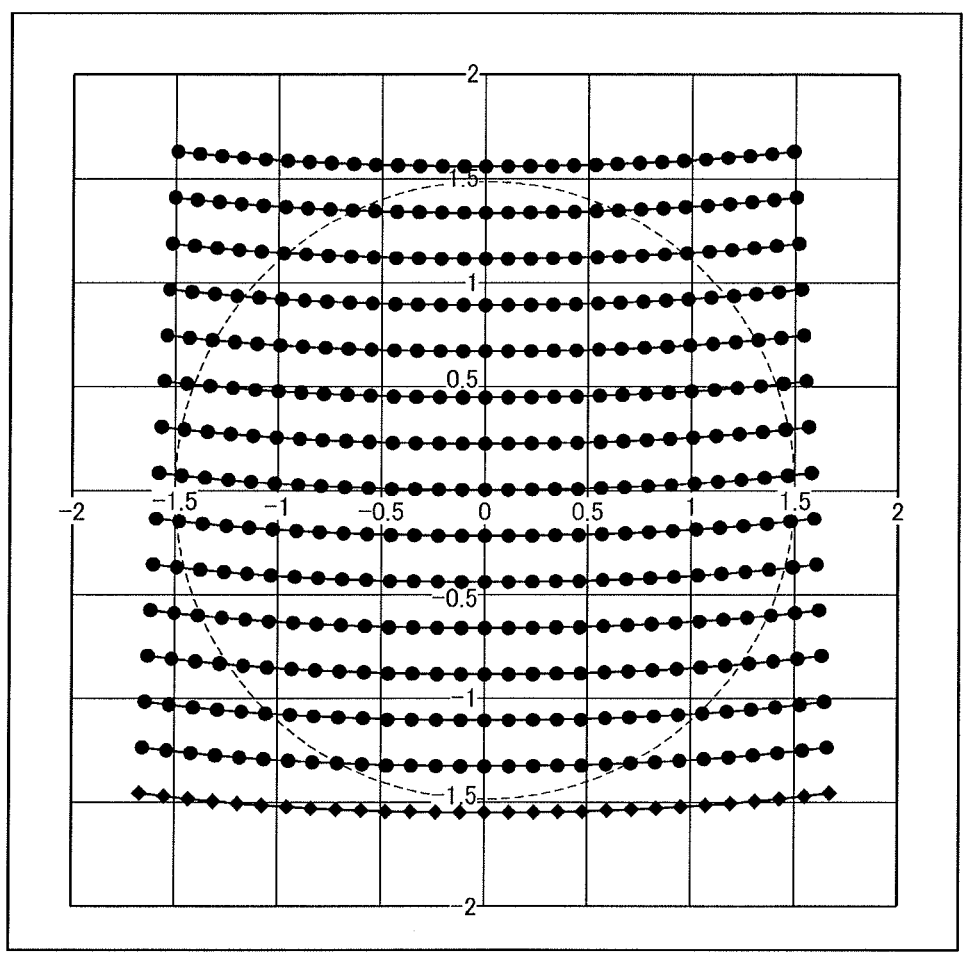
FIG. 5 is a diagram illustrating the movement of the point L.

FIG. 5 is a diagram illustrating the movement of the point L when Ra=15, Rb=11.5, and d=15. In FIG. 5, the trace of points L caused by change in angle of beta is shown when the value of Ra is constant. The circle shown in the broken line in FIG. 5 is the movable circle of the correction lens 102. The point L is movable to any position within the movable circle.

Figure 6:
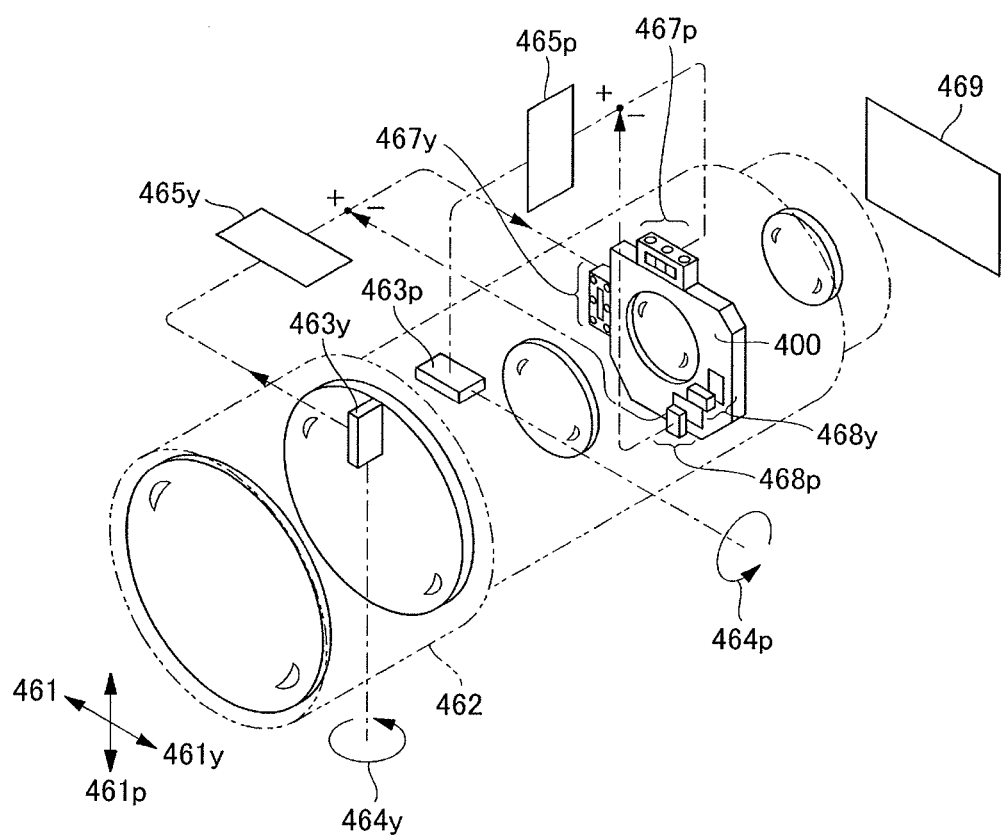
FIG. 6 is a diagram illustrating an example of the configuration of an image stabilization system using an image stabilization apparatus.

Next, a description will be given of an image stabilization system using the image stabilization apparatus of the present embodiment with reference to FIGS. 6 and 7. FIG. 6 is a diagram illustrating an example of the configuration of an image stabilization system using the image stabilization apparatus of the present embodiment. The image stabilization system shown in FIG. 6 suppresses image blur caused by a camera pitch vibration 461*p* and a camera yaw vibration 461*y* in the directions shown by the arrow 461. A lens barrel 462 has an imaging optical system. An angle displacement detection device 463*p* detects a camera pitch vibration angular displacement. An angle displacement detection device 463*y* detects a camera yaw vibration angular displacement.

The angle displacement detection direction of the angle displacement detection device 463*p* is the direction shown by an arrow 464*p*. Also, the angle displacement detection direction of the angle displacement detection device 463*y* is the direction shown by an arrow 464*y*. The reference numbers 465*p* and 465*y* denote calculation circuits that calculate a signal from the angle displacement detection devices 463*p* and 463*y*, respectively, and convert the signal into a drive target signal of an image stabilization apparatus 400. Then, the image stabilization apparatus 400 is driven by the signal, whereby stability of an image plane 469 is ensured.

Among the drive sources 467*p* and 467*y* of the image stabilization apparatus 400, the first drive source 467*p* corresponds to, for example, the first motor 106 shown in FIG. 1. Also, the second drive source 467*y* corresponds to, for example, the second motor 107 shown in FIG. 1. Shift position detection sensors 468*p* and 468*y* of the correction lens 102 may perform closed-loop control such that the difference between a signal of the shift detection sensors 468*p* and 468*y* and the drive target signal becomes zero or may also perform open-loop control without mounting a shift detection sensor.

As shown in FIG. 5, in the present embodiment, the correction lens 102 moves along a curved movement path close to a line when the first rotary body 104 and the second rotary body 105 are rotated independently of each other. When the condition in which the movement can be approximated as a line is satisfied, pitch directional control is made by the rotation of the first rotary body 104 and yaw directional control is made by the rotation of the second rotary body 105.

The above condition is satisfied if Ra and Rb are sufficiently large as compared with the lens movable range and the movable region of the first rotary body 104 and the second rotary body 105 is narrow. At this time, the guide direction of the fixed guide section 1111 is aligned with the pitch direction and then the center of the second rotary body 105 and the drive pin 1051 are arranged in the guide direction of the fixed guide section 1111. With this arrangement, the correction lens 102 substantially moves in the pitch direction by the movement of the first rotary body 104 and the correction lens 102 substantially moves in the yaw direction by the movement of the second rotary body 105. When the movement track can be approximated as a line as compared with the position accuracy required for the correction lens 102, the target position of the first rotary body 104 is set by multiplying the target signal in the pitch direction by a predetermined coefficient. Also, the target position of the second rotary body 105 is set by multiplying the target signal in the yaw direction by a predetermined coefficient.

Figure 7A:
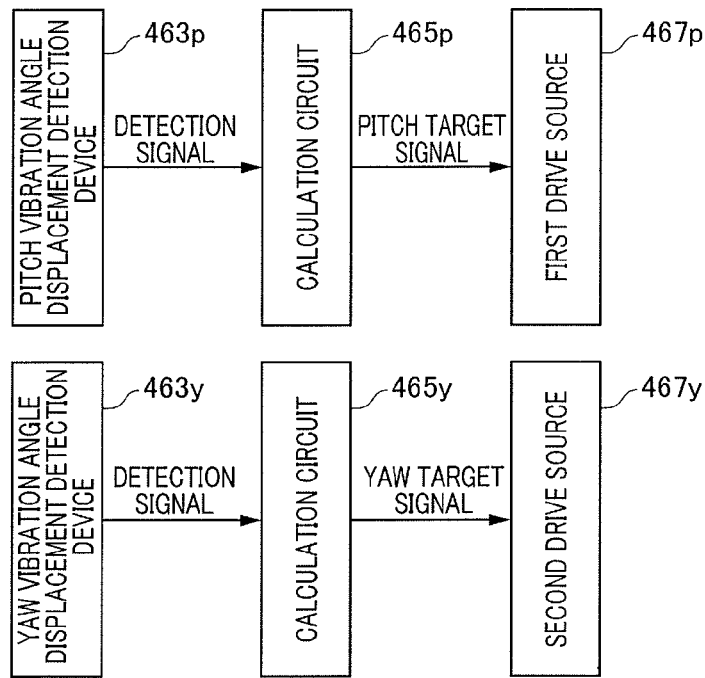
FIG. 7A is a conceptual diagram illustrating processing for calculating a target signal to be input to a drive source.

FIG. 7A is a conceptual diagram illustrating processing for calculating a target signal to be input to the first drive source 467*p* and the second drive source 467*y* when the movement track of a correction lens can be approximated as a line as compared with the position accuracy required for the lens.

Figure 7B:
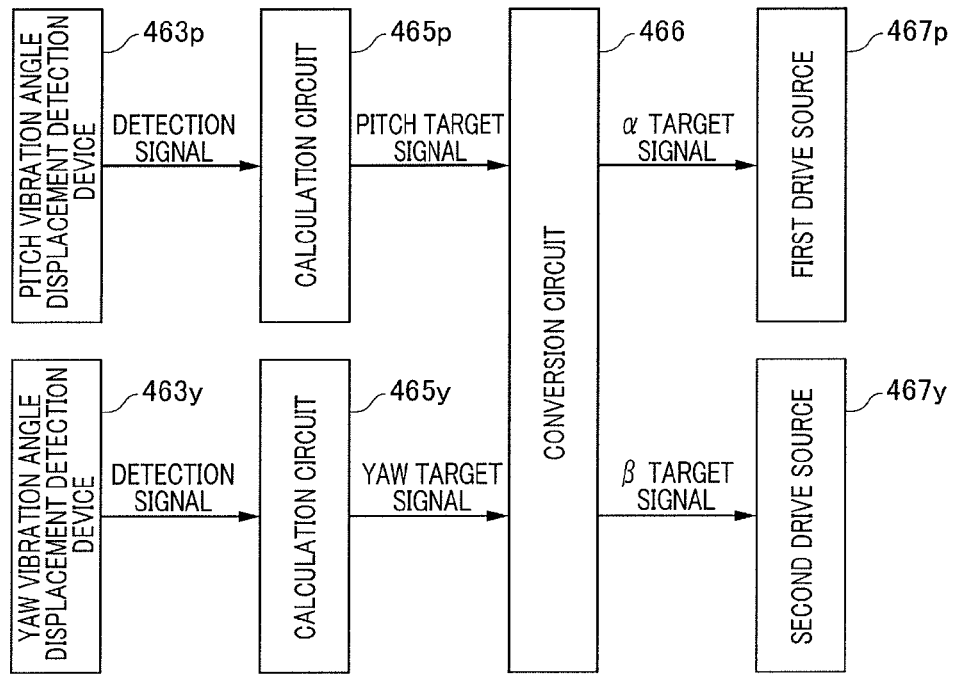
FIG. 7B is a conceptual diagram illustrating processing for calculating a target signal to be input to a drive source.

On the other hand, when the position accuracy required for the correction lens 102 is high or when the movement of the correction lens 102 cannot be approximated as a line due to the mechanical condition of the image stabilization apparatus, both the first rotary body 104 and the second rotary body 105 are rotated in order to realize movement in the yaw direction. Also, both the first rotary body 104 and the second rotary body 105 are rotated in order to realize movement in the pitch direction. The conceptual diagram illustrating processing for calculating a target signal to be input to the first drive source 467*p* and the second drive source 467*y* in this case is shown in FIG. 7B. A conversion circuit 466 performs coordinate transformation processing for a target signal from the calculation circuits 465*p* and 465*y* using the following Formulae (4) and (5) which are the inverse functions of Formula (3) and then inputs the target signal obtained by the coordinate transformation processing to the first and second drive units.

[Formula 3]

$$D^2 = d_1^2 + d_2^2 \quad \text{Formula (4)}$$
$$R_a = L_y + \sqrt{D^2 - L_x^2}$$

$$\beta = \cos^{-1}\left(\frac{1}{D^2}\sqrt{D^4 - \left(d_1 L_x - d_2\sqrt{D^2 L_x^2}\right)^2}\right) - \quad \text{Formula (5)}$$
$$\cos^{-1}\frac{1}{R_b}\frac{d_1 L_x - d_2\sqrt{D^2 - L_x}}{D^2}\left(L_y + \frac{d_2}{D^2}\left(d_2\sqrt{D^2 - L_x^2} - d_1 L_x\right) + \frac{d_1}{D^2}\sqrt{D^4 - \left(d_1 L_x - d_2\sqrt{D^2 - L_x^2}\right)^2}\right)$$

In this manner, the target position Ra of the drive pin 1031 and the target position beta of the second rotary body 105 can be calculated using the target ($L_x$, $L_y$) computed by an angular displacement gauge in the yaw direction and the pitch direction. Since the drive pin 1031 is positioned at the intersection between the cam groove 1041 and the fixed guide section 1111, the target position alpha of the first rotary body 104 can be back-calculated from the shape of the cam groove 1041. In the present embodiment, the shape of the center axis of the cam groove 1041 is represented by the equation: Ra=kalpha, and thus, alpha is calculated by the following Formula:

[Formula 4]

$$\alpha = \frac{L_y + \sqrt{d^2 - L_x^2}}{k} \quad \text{Formula (6)}$$

Also, the correspondence table including the correspondence between alpha and the target ($L_x$, $L_y$) is prepared in advance and alpha may be determined with reference to the correspondence table.

For example, when $d_2=0$, a target signal may also be calculated using the following Formula (7) as a coordinate conversion equation:

[Formula 5]

$$R_a = L_y + \sqrt{d^2 - L_x^2} \quad \text{Formula (7)}$$
$$\beta = \cos^{-1}\frac{\sqrt{d^2 - L_x^2}}{d} - \cos^{-1}\frac{L_x}{R_b d}\left(L_y + \sqrt{d^2 - L_x^2}\right)$$

Next, a description will be given of the effects of the present embodiment. In the image stabilization apparatus of the present embodiment, the first and second rotary bodies are the hollow structures and are coaxially arranged, and a lens movable barrel is arranged therein, resulting in higher space efficiency.

Figure 8A:
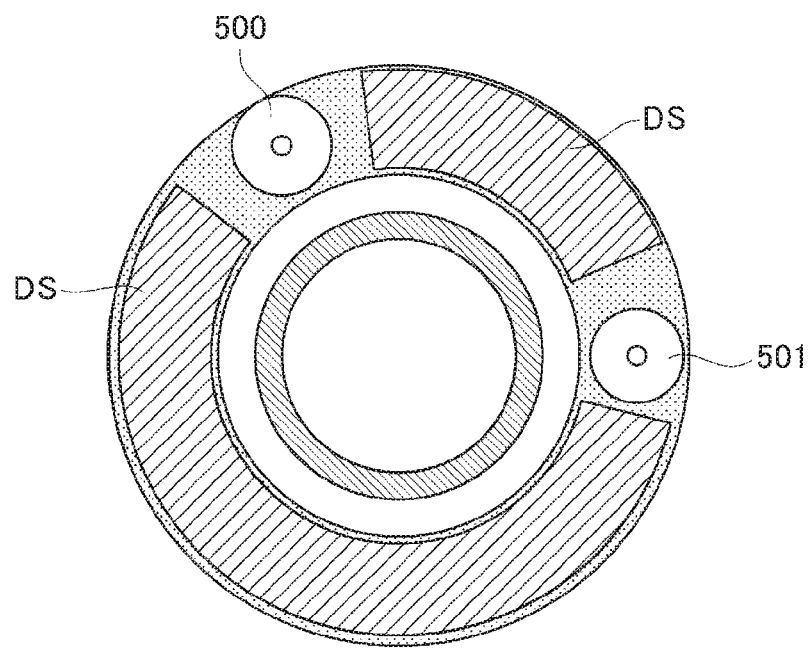
FIG. 8A is a diagram illustrating the effects of a conventional image stabilization apparatus.
Figure 8B:
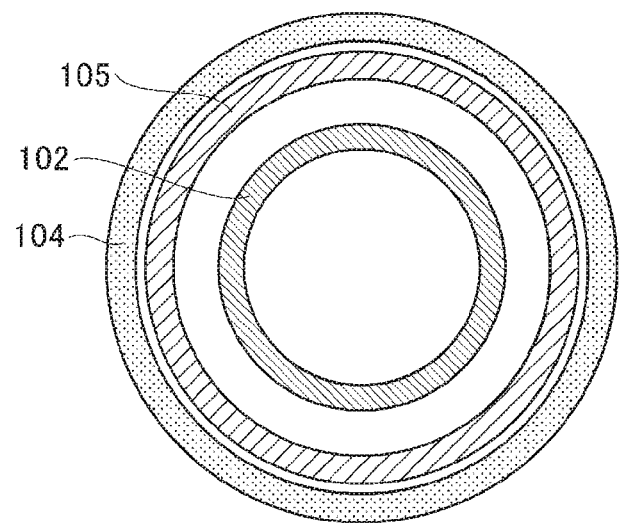
FIG. 8B is a diagram illustrating the effects of the image stabilization apparatus according to the first embodiment.

FIGS. 8A and 8B are conceptual diagrams illustrating the effects of the image stabilization apparatus of the present embodiment. FIG. 8A shows a conventional image stabilization apparatus. FIG. 8B shows the image stabilization apparatus of the present embodiment. In the conventional image stabilization apparatus, rotary bodies 500 and 501 used for driving a movable barrel are arranged outside the movable range of the movable barrel. On the other hand, a lens barrel is normally in a cylindrical shape, and thus, it is preferable that the image stabilization apparatus is also in a cylindrical shape. However, a large dead space DS is created in the conventional image stabilization apparatus as shown in FIG. 8A.

On the other hand, in the image stabilization apparatus of the present embodiment, all of the first rotary body 104, the second rotary body 105, and the movable barrel are constituted in a cylindrical shape and are arranged so as to be overlapped on the same axis. Thus, almost no dead space is created as shown in FIG. 8B. The opening of the first rotary body 104 and the second rotary body 105 can be used as the optical path of the correction lens 102. In other words, according to the image stabilization apparatus of the present invention, an increase in size of the entire apparatus may be suppressed while a space in which the correction lens 102 moves is ensured.

While, in the present embodiment, the second rotary body 105 is arranged inside the first rotary body 104, the present invention is not limited to the configuration. The first rotary body 104 and the second rotary body 105 may be arranged in series in the rotation axis direction by making the diameter of the first rotary body 104 the same as that of the second rotary body 105. In this manner, although the entire apparatus becomes thick in the rotation axis direction, the diameter of the entire apparatus can be reduced by the thickness of the first rotary body 104.

In the present embodiment, the radius of the rotary body is greater than the summation of the radius of the movable barrel and the amount of movement required for the correction lens 102. Thus, in the image stabilization apparatus of the present embodiment, the radius of the rotary body can be increased while avoiding larger diameter of the entire apparatus as compared with the conventional structure in which the rotating axis of the rotary body is formed outside the correction lens 102. In other words, according to the image stabilization apparatus of the present embodiment, the speed reduction ratio between the drive unit and the transfer mechanism of the movable barrel can be readily increased. In this manner, the output required for the drive unit can be reduced, whereby a smaller motor is applicable thereto.

Also, according to the image stabilization apparatus of the present embodiment, a torque while a motor is stopped such as a cogging torque is also boosted, so that the position of the correction lens 102 can be held even when electric current is not flown to the drive unit. Thus, the necessity of preparing another lock mechanism for holding the position of the correction lens 102 is eliminated, whereby an increase in the number of part items can be avoided. In this manner, both size reduction and cost saving can be realized.

In the present embodiment, the positioning of the movable barrel is performed by fitting a circle hole and an elongated hole to two output pins. For this reason, the movable barrel has the degree of freedom in only two directions corresponding to rotational motion wherein the drive pin (first shaft portion) is a central axis and translation motion to the fixed guide section (first guide section) direction. Thus, when the angular positions of the first rotary body 104 and the second rotary body 105 are determined, the position of the movable barrel is uniquely determined. Consequently, the position of the correction lens 102 can be accurately determined without involving rolling motion even if disturbances occur. Furthermore, the necessity of separately providing a rotation preventing mechanism to the movable barrel is eliminated, whereby an increase in the number of part items can be avoided.

The type and arrangement of a drive source which is applied to the present invention are not limited to those described above. In the present embodiment, a stepping motor is used as a drive source. The first and second rotary bodies may also be rotated using a known drive source such as a voice coil motor, a ultrasonic motor using a piezoelectric element, a super magnetostrictive actuator, or the like.

While, in the present embodiment, a gear-type transfer mechanism is used between a rotary body and a drive source, a direct drive method in which a rotary body is directly connected to the rotor of a drive source may also be used. In this manner, a transfer section can be eliminated, which is advantageous for reducing the number of part items and eliminating backlash which occurs in the transfer section.

Figure 9:
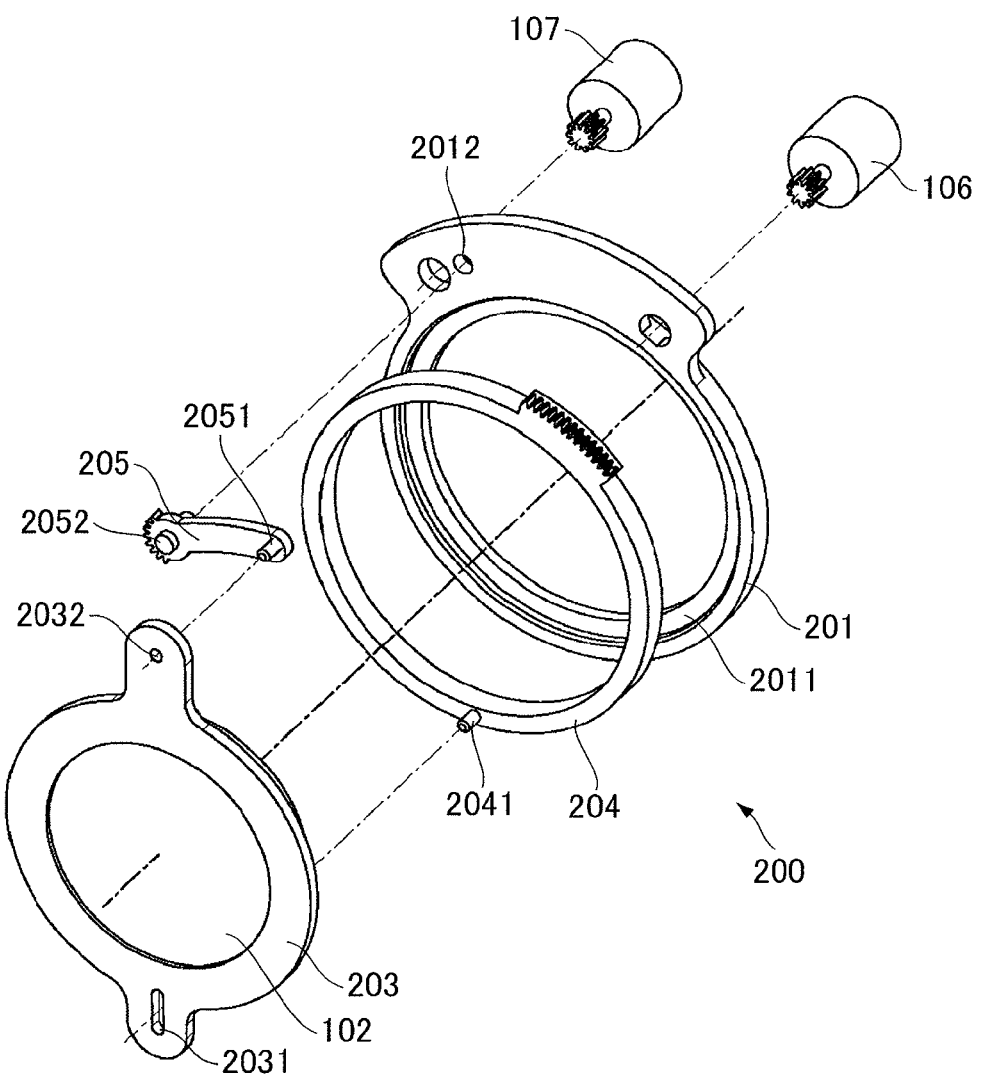
FIG. 9 is an exploded perspective view illustrating the configuration of the parts of an image stabilization apparatus according to a second embodiment.
Figure 10:
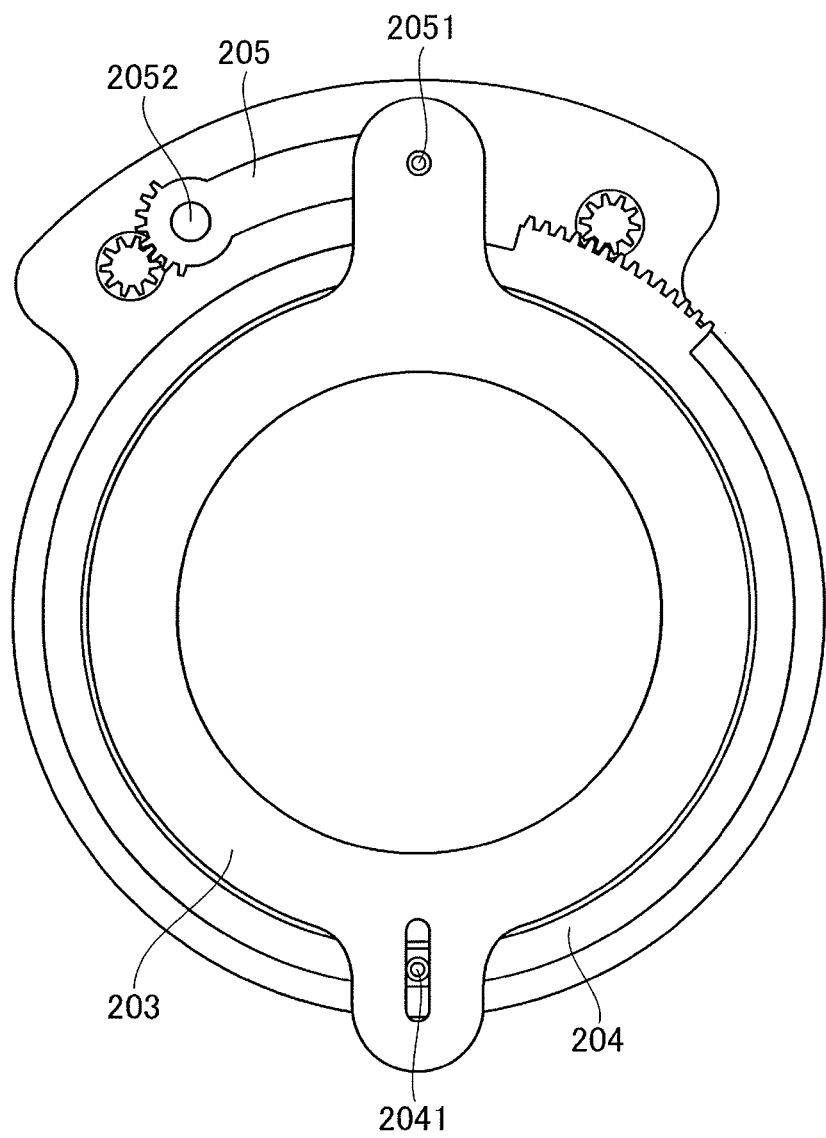
FIG. 10 is a front view illustrating an image stabilization apparatus after the assembly.
Figure 11:
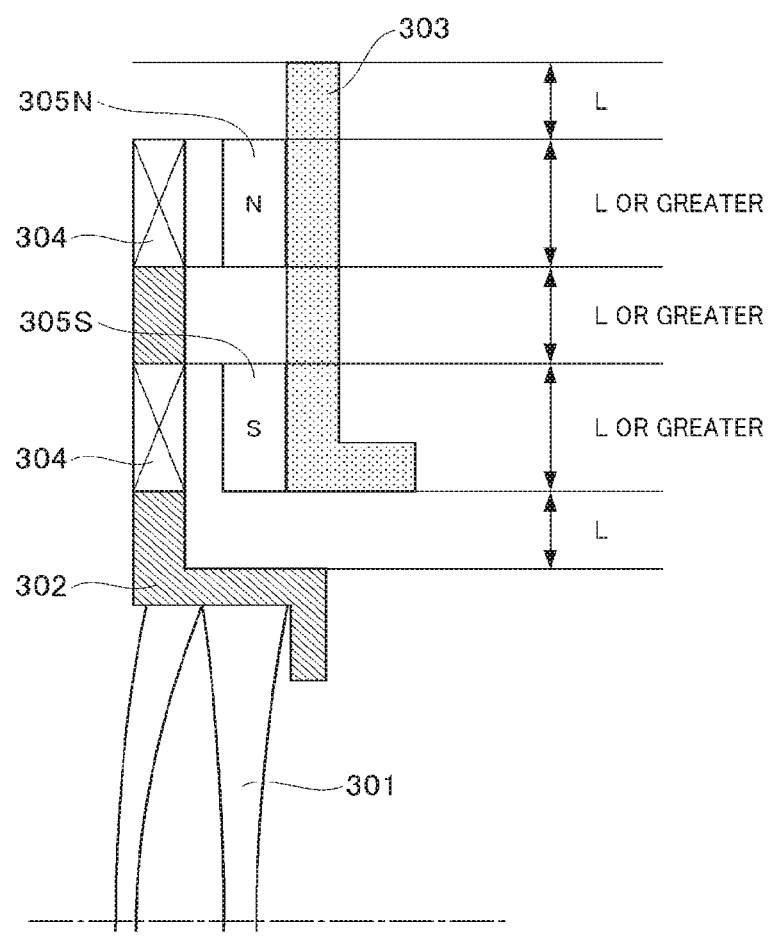
FIG. 11 is an exemplary cross-sectional diagram of an image stabilization apparatus using a flat-type voice coil motor.

FIG. 9 is an exploded perspective view illustrating the configuration of the parts of an image stabilization apparatus according to a second embodiment. FIG. 10 is a front view illustrating an image stabilization apparatus after the assembly. Among the components provided in an image stabilization apparatus 200, components corresponding to those provided in the image stabilization apparatus 100 shown in FIG. 1 are designated by the same reference numerals, and therefore, its explanation will be omitted.

The image stabilization apparatus 200 includes a fixed back-plate 201, the correction lens 102, a movable barrel 203, a first rotary body 204, a second rotary body 205, the first motor 106, and the second motor 107. The fixed back-plate 201 is formed in a generally disk-shape. The fixed back-plate 201 has an opening, which is greater than the external shape of the movable barrel, formed at the center thereof. The movable barrel 203 is arranged in the opening. The movable range of the movable barrel 203 is restricted by the opening. Also, the fixed back-plate 201 has a first bearing portion 2011 cylindrically formed around the opening. The first bearing portion 2011 can pivotally support the first rotary body 204 at the inner peripheral part thereof. Also, the fixed back-plate 201 has a second bearing portion 2012 that can pivotally support the second rotary body 205. The first motor 106 and the second motor 107 can be fixed to the fixed back-plate 201.

The movable barrel (movable member) 203 can hold the correction lens 102 at the central opening thereof. Also, the movable barrel 203 includes an elongated hole 201 and a joint section 2032. The first rotary body 204 has a hollow cylindrical shape and the correction lens 102 is arranged at the central opening thereof. Thus, the center axis of the first rotary body 204 is substantially coaxial with the optical axis obtained when the correction lens 102 is located at the center of the movable region. The center axis of the first rotary body 204 is arranged within the optical path formed by the correction lens 102.

The outer periphery of the first rotary body 204 is pivotally supported by the first bearing portion 2011 so that the first rotary body 204 is rotatably supported by the fixed back-plate 201. Also, the first rotary body 204 has a drive pin 2041 that is fit in an elongated hole 2031. The drive pin 2041 is a first drive pin in the second embodiment. Also, the first rotary body 204 has a gear provided on a part of the outer periphery thereof and can cause the gear to be rotationally driven by the rotation of the first motor 106 serving as the first drive unit.

The second rotary body 205 is a link having a drive pin 2051 and a rotation center shaft 2052. The drive pin 2051 is a second drive pin in the second embodiment. The rotation center shaft 2052 is rotatably supported by the second bearing portion 2012. The drive pin 2051 fits with the first joint section 2032. Also, the second rotary body 205 has a gear provided on a part of the outer periphery thereof and can cause the gear to be rotationally driven by the rotation of the second motor 107 serving as the second drive unit.

Hereinafter, a description will be given of the operation performed by the image stabilization apparatus of the second embodiment. In the movable barrel 203, the joint section 2032 is fit in the drive pin 2051, and thus, positioning one point on the movable barrel 203 is achieved. Then, the elongated hole 1032 is fitted to the drive pin 2041 so that the angular direction of the movable barrel 203 is determined. In this manner, the position of the movable barrel 203 is uniquely determined. In this state, the correction lens 102 is movable to any position on a plane perpendicular to the optical axis by moving the first and the second rotary bodies to predetermined positions.

When the first rotary body 204 is rotated in a state where the second rotary body 205 is stationary, the movable barrel 202 performs rotational movement about the drive pin 2051. Thus, the center of the correction lens 102 moves on an arc line. The movement direction of the movable barrel 203 in this case is the first direction in the second embodiment.

On the other hand, when the second rotary body 205 is rotated in a state where the first rotary body 204 is stationary, the drive pin 2051 moves in an arc about a center shaft 2052. Thus, the center of the correction lens 102 is moved on a substantial arc line. Since the center of the correction lens 102 is moved while the elongated hole 2031 provided on the movable barrel 203 for holding the correction lens 102 is being guided by the drive pin 2041, the center of the correction lens 102 draws a trace which is different from that of the drive pin 2051. The movement direction of the movable barrel 203 in this case is the second direction in the second embodiment. The correction lens 102 is movable to any position within a plane by combining the movement of the movable barrel 103 in the first direction with the movement of the movable barrel 103 in the second direction.

In the image stabilization apparatus of the second embodiment, only the first rotary body 204 has a hollow shape, and the first rotary body 204 is arranged such that the rotating axis thereof goes through the correction lens 102. In this manner, the first rotary body 204 can be arranged so as to surround the periphery of the correction lens 102. Thus, according to the image stabilization apparatus of the second embodiment, a dead space can be reduced as compared with the conventional image stabilization apparatus shown in FIG. 8A. Since the second rotary body is a projection, the present embodiment is suitable for the case when the image stabilization apparatus has a projection at one location.

The same image stabilization system as that described with reference to FIGS. 6 and 7 may also be configured by use of the image stabilization apparatus of the second embodiment. The configuration of the present invention is not limited to those illustrated in the above embodiments, but the material, shape, size, type, number, and location thereof may be modified as appropriate without departing from the scope of the present invention.

In the first and second embodiments, a description has been given of the case where the present invention is applied to an image stabilization apparatus. However, the example in which the present invention is applied is not limited to the image stabilization apparatus. The present invention may also be applicable to a stage apparatus that is capable of independently controlling the drive target in two different directions. Also, the image stabilization apparatus of the present invention is mountable to an imaging apparatus such as a video camera, a digital camera, or a silver salt still camera or an optical apparatus including an observation device such as a binocular, a telescope, a field scope, or the like. Thus, an optical apparatus having the image stabilization apparatus of the present invention also constitutes one aspect of the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-051457 filed on Mar. 8, 2012, which is hereby incorporated by reference herein in its entirety.

The invention claimed is:

1. An image stabilization apparatus comprising:
a fixation member;
a movable member that holds an image stabilization unit for correcting image blur and is movable in a direction not in parallel with the optical axis of an image capturing optical system;
a first rotation member that rotates by being supported by the fixation member and moves the movable member in a first direction;
a second rotation member that rotates by being supported by the fixation member and moves the movable member in a second direction different from the first direction;
wherein the rotating axis of at least one of the first and the second rotation members is arranged within the optical path of the image capturing optical system;
a first drive unit that drives the first rotation member; and
a second drive unit that drives the second rotation member.

2. The image stabilization apparatus according to claim 1, wherein each of the first and the second rotation members is a circular hollow member and the rotating axis of at least one of the first and the second rotation members is positioned at the center of the movable range of the image stabilization unit.

3. The image stabilization apparatus according to claim 1, wherein both the rotating axis of the first and the second rotation members are arranged within the optical path of the image capturing optical system.

4. The image stabilization apparatus according to claim 1, wherein the fixation member has a first guide portion, the movable member has a first shaft portion and a second guide portion, the second rotation member has a second shaft portion, the first shaft portion is guided by a third guide portion provided on the first rotation member, and the second shaft portion is guided by the second guide portion.

5. The image stabilization apparatus according to claim 4, wherein the first guide portion guides the first shaft portion in the peripheral direction of the first rotation member such that distances in the radial direction of the first rotation member vary, and the second guide portion extends toward the rotation center of the second rotation member.

6. The image stabilization apparatus according to claim 4, wherein the first shaft portion and the first guide portion are arranged point symmetrically about the image stabilization unit.

7. The image stabilization apparatus according to claim 4, wherein the first shaft portion is a cylindrical shaft, the second shaft portion is a cylindrical shaft or a spherical shaft, the first guide portion is a linear groove that fits with the first shaft portion, the second guide portion is a linear groove that fits with the second shaft portion, the third guide portion fits with the first shaft portion, and the intersection of the third guide portion with the first shaft portion varies depending on the rotation of the first rotation member.

8. The image stabilization apparatus according to claim 1, wherein an urging unit for imparting an urging force to the movable member in a direction perpendicular to the optical axis is provided between the movable member and the fixation member.

9. The image stabilization apparatus according to claim 1, wherein the image stabilization unit is a correction lens.

10. An optical apparatus comprising:
the image stabilization apparatus according to claim 1.

11. An imaging apparatus comprising:
the image stabilization apparatus according to claim 1.

* * * * *